United States Patent [19]

Lawlor et al.

[11] Patent Number: 5,058,851

[45] Date of Patent: Oct. 22, 1991

[54] MOUNTING ASSEMBLY FOR REARVIEW MIRROR

[75] Inventors: Patrick J. Lawlor, Dublin; John J. McCormack; John P. Desmond, both of Newbridge, all of Ireland

[73] Assignee: Donnelly Mirrors Limited, Naas, Ireland

[21] Appl. No.: 508,055

[22] Filed: Apr. 11, 1990

[30] Foreign Application Priority Data

Apr. 14, 1989 [IE] Ireland ................... 1211/89

[51] Int. Cl.$^5$ ........................... F16M 13/00
[52] U.S. Cl. ................. 248/549; 248/222.1; 248/223.4; 248/900
[58] Field of Search ............ 248/549, 900, 222.1, 248/223.4, 224.4, 220.2, 225.1, 475.1, 548

[56] References Cited

U.S. PATENT DOCUMENTS

| | | | |
|---|---|---|---|
| 3,003,734 | 10/1961 | Davis et al. | 248/223.3 |
| 3,596,867 | 8/1971 | Allander | 248/549 X |
| 3,928,894 | 12/1975 | Bury et al. | 248/223.4 X |
| 4,012,022 | 3/1977 | Tomita | 248/549 |
| 4,254,931 | 3/1981 | Aikens et al. | 248/549 |
| 4,524,941 | 6/1985 | Wood et al. | |
| 4,632,348 | 12/1986 | Keesling et al. | 248/222.1 |
| 4,874,147 | 10/1989 | Ory et al. | 248/222.1 X |
| 4,936,533 | 6/1990 | Adams et al. | 248/222.1 |
| 4,948,085 | 8/1990 | Mittelhäuser | 248/549 |

FOREIGN PATENT DOCUMENTS

| | | | |
|---|---|---|---|
| 2354551 | 5/1975 | Fed. Rep. of Germany | 248/549 |
| 1224875 | 3/1971 | United Kingdom . | |
| 1234025 | 6/1971 | United Kingdom | 248/549 |
| 1387591 | 3/1975 | United Kingdom . | |
| 1395699 | 5/1975 | United Kingdom . | |
| 2048803 | 12/1980 | United Kingdom . | |

Primary Examiner—Rodney M. Lindsey
Assistant Examiner—Michael J. Milano
Attorney, Agent, or Firm—Price, Heneveld, Cooper, DeWitt & Litton

[57] ABSTRACT

A mounting assembly for a vehicle interior rear view mirror has a base part for attaching directly to the inside surface of a vehicle windscreen, a mirror case support bracket having at one end a spherical ball for mounting a mirror case and at the other end a spring clip arrangement for sliding engagement with the base part to mount the bracket onto the base part. Bearing surfaces are provided on the base part and bracket respectively which come to bear against one another as the bracket approaches its fully engaged position during said sliding engagement and are effective to force the bracket slightly away from the base part against the resilient bias of the clip so as to increase the force exerted by the clip on the flange means in the fully engaged position.

7 Claims, 4 Drawing Sheets

MOUNTING ASSEMBLY FOR REARVIEW MIRROR

BACKGROUND OF THE INVENTION

The present invention relates to a mounting assembly for a vehicle interior rear view mirror.

SUMMARY OF THE INVENTION

According to the invention there is provided a mounting assembly for a vehicle interior rear view mirror, the assembly comprising a base part for attaching directly to the inside surface of a vehicle windscreen, a mirror case support bracket having at one end means for mounting a mirror case and at the other end means for sliding engagement with the base part to mount the bracket onto the base part, and abutment means on one of the bracket and base part for engaging a portion of the other of the bracket and base part to define a fully engaged position of the bracket on the base part, one of said base part and bracket having a resilient clip and the other of said base part and bracket having flange means and said clip and flange means being brought into contact during said sliding engagement and being effective to retain the bracket on the base part by resilient engagement of the clip with the flange means, the bracket further being blow-releasable from the base part in the fully engaged position, characterized in that bearing surfaces are provided on the base part and bracket respectively which come to bear against one another just as the bracket nears its fully engaged position during said sliding, when the abutment means engage the said portion, are effective to force the bracket slightly away from the base part against the resilient bias of the clip, compared to the position of the bracket during the prior part of the sliding engagement, so as to increase the force exerted by the clip on the flange means when in the fully engaged position.

Embodiments of the invention will now be described, by way of example, with reference to the accompanying drawings.

DESCRIPTION OF THE PREFERRED EMBODIMENTS

Figure 1:
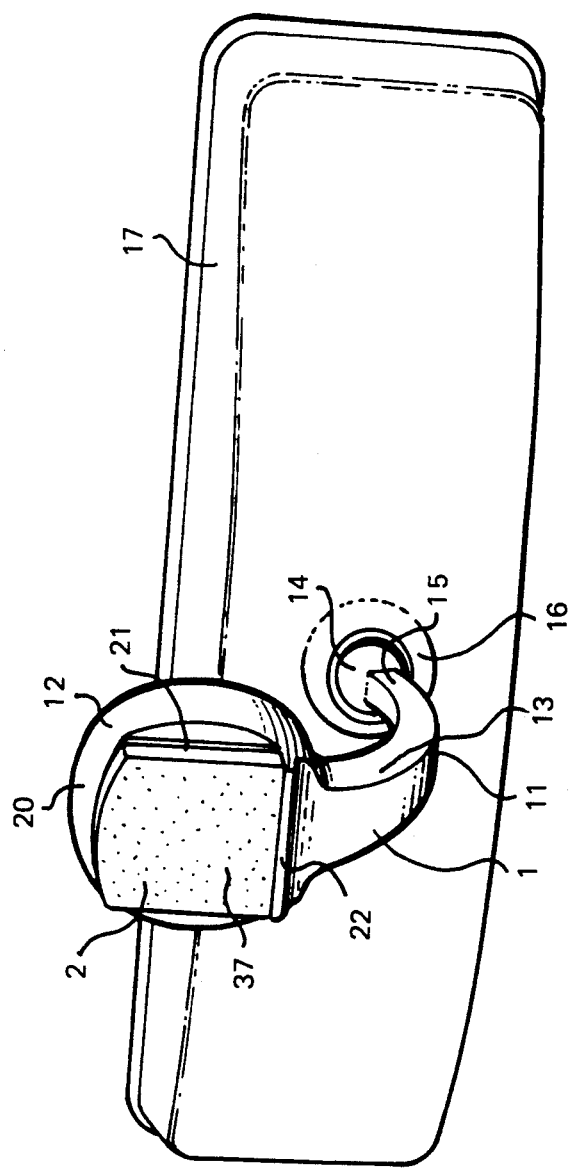
FIG. 1 is a rear perspective view of a mounting assembly according to the invention.
Figure 5:
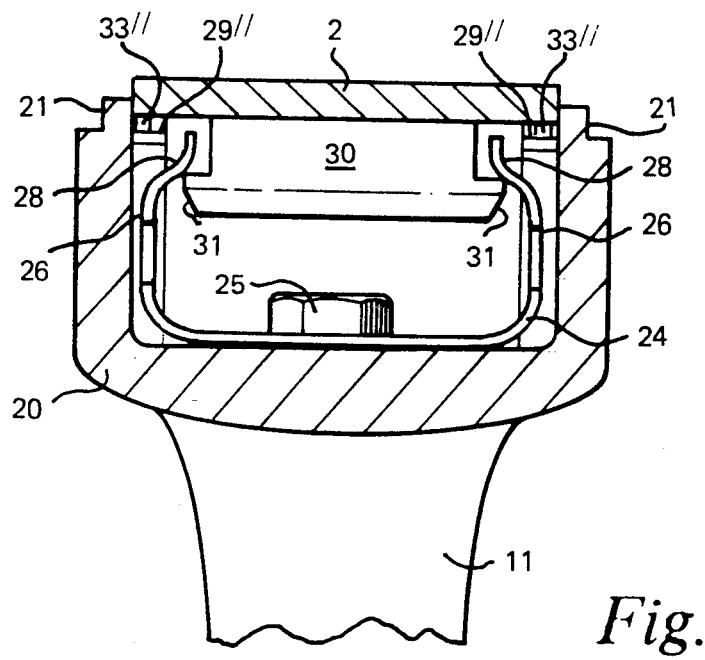
FIG. 5 is a diagrammatic cross-sectional end view of the mounting assembly.

Referring now to the drawings wherein similar numerals have been used to indicate like parts, there is shown therein a mounting assembly for a vehicle interior rear view mirror comprising a one-piece plastics support bracket 1 and a substantially inflexible base part 2. The bracket 1 comprises a support arm 11 having a clip arrangement 12 at one end 13 of the arm 11. The bracket 1 is molded from plastics material such as ACETAL or NORYL (Registered Trade Mark) or other relatively rigid plastics material and is integrally formed with a spherical ball 14 at the other end 15 of the arm 11 for insertion in a complementary socket 16 in a mirror holding case 17 according to the conventional technique for universally adjustable support of a mirror case.

The clip arrangement 12 at the end 13 of the arm 11 is formed as a sliding clip connector with spring urged clip means 24 by which the bracket 1 is attached to the rigid base part 2.

The base part 2, which is typically of metal is in use securely bonded directly to the inside surface of a vehicle windscreen 18 (FIG. 4) by use of a suitable adhesive such as polyacrylate, and the bracket 1 may be released from connection with the base part 2, by means to be described in detail below, when the bracket 1 receives an impact via the mirror case.

As is well known in the art, it will be understood that the base part 2 is preferably composed of a material whose linear coefficient of thermal expansion is in the range $8-35 \times 10^{-6}/°C$ so that under windscreen 18 the base part 2 will not expand or contract much differently to the windscreen area to which it is glued.

The support arm 11 forming the greater part of the bracket 1, is of a suitable cross-section that it is sufficiently rigid for the purpose of supporting the mirror case and under normal conditions is substantially free from any tendency towards flexible vibrations of the bracket component itself.

The clip arrangement 12 comprises a generally hollow housing 20 having raised sidewalls 21 and a bottom wall 22. The housing is open at its upper end 23 to facilitate sliding engagement with the base part 2 as will be described.

Figure 4:
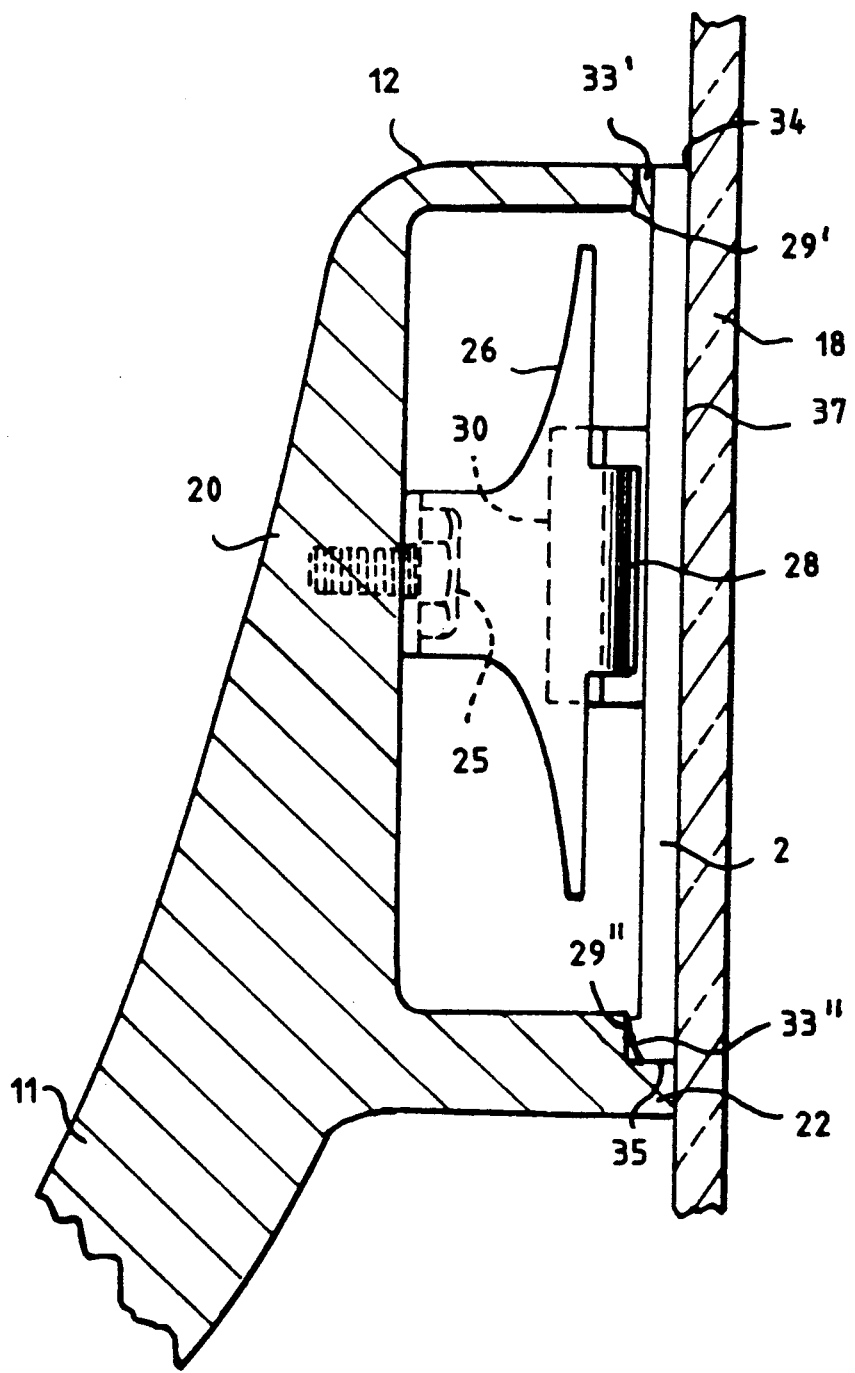
FIG. 4 is a diagrammatic cross-sectional side view of the mounting assembly.

A spring clip 24 is fixed in the housing 20 by means of a bolt 25 which is screwed into the housing 20 (FIG. 4). The spring clip 24 has upstanding arms 26 which are inherently resilient and capable of slight movement towards and away from each other. The outermost ends 27 of the arms 26 are formed having arcuate tongues 28 which curve towards each other.

Figure 3:
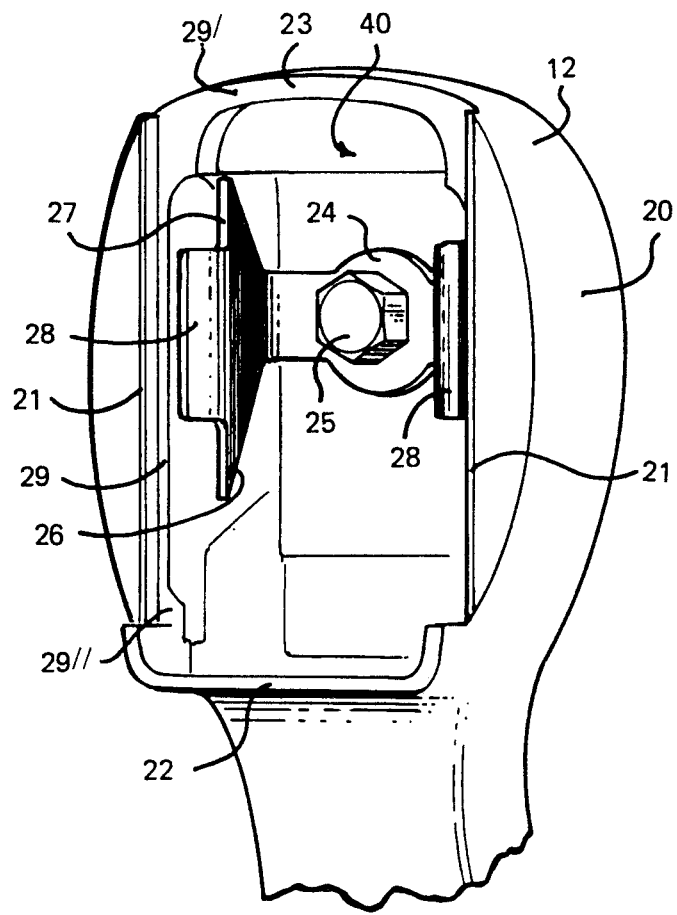
FIG. 3 is a perspective view of the clip arrangement of FIG. 1.

A peripheral rim 29 of the housing 20 defined within the sidewalls 21 and bottom wall 22 comprise a bearing surface for engagement with complementary bearing surfaces on the base part 2. More specifically, the upper end 23 of the housing 20 comprises a first bearing surface 29′ and the lower side parts of the rim comprise second and third bearing surfaces 29″ adjacent to the bottom wall 22 of the housing. The bearing surfaces 29″ slope upwardly (i.e. out of the plane of FIG. 3) in the direction towards the bottom wall 22 of the housing.

Figure 2:
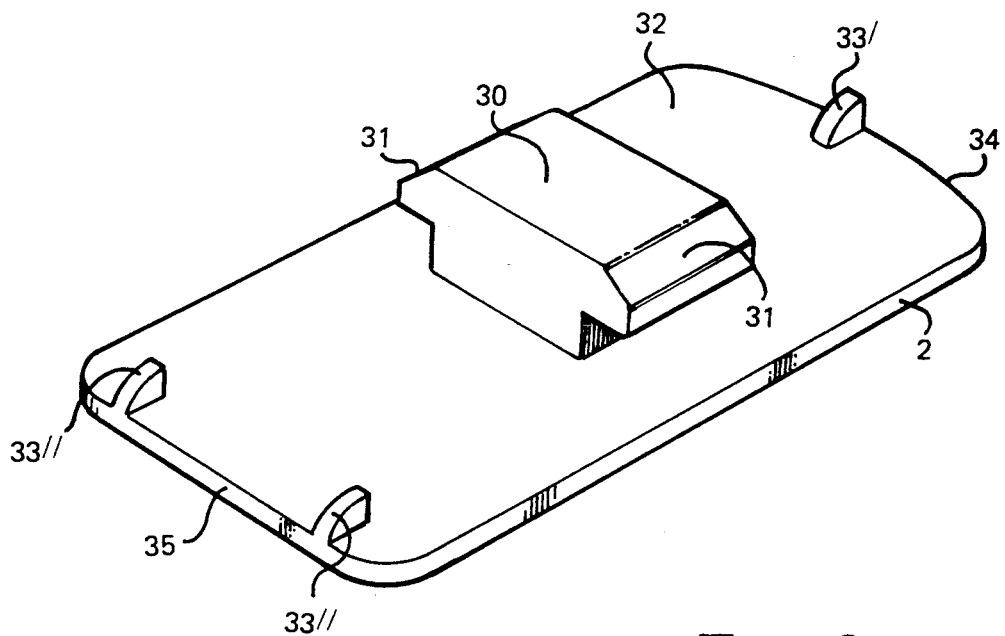
FIG. 2 is a perspective view of the base part of the assembly in FIG. 1.

The base part 2 (FIG. 2) comprises a generally flat member having an upstanding generally 'T' shaped boss 30 integrally formed therewith, having flange parts 31. The boss 30 is located on the innermost surface 32 of the base part 2, and further comprises bearing surfaces 33′,33″ in the form of inclined projections on the surface 32. A first bearing surface 33′ is disposed adjacent the top edge 34 of the base part 2, and second and third bearing surfaces 33″ are disposed adjacent the bottom edge 35 of the base part 2.

In use, the outermost surface 37 of the base part 2 is bonded to a vehicle windscreen 18 with the top edge 34 of the base part 2 uppermost. The housing 20 is then located adjacent the lower end of the base part 2, with the boss 30 located within the top part 40 of the housing 20, and the housing is then slid upwardly so that the flanges 31 engage underneath the arcuate tongues 28 of the spring clip 24.

As the sloped bearing surfaces 33" of the base part 2 meet the sloping bearing surfaces 29" of the housing 20, a considerable force is required to mate the housing 20 fully on the base part 2. This force arises because as the bearing surfaces 33" meet and engage on the bearing surfaces 29" the housing 20 is forced outwards slightly in a direction away from the base part 2 so that the flanges 31 on the boss 30 engage under the tongues 28 of the spring clip 24, acting to force the tongues 28 very slightly apart against their inherent resilience. In the fully engaged position of the housing 20 on the base part 2, the lower edge 35 of the base part 2 abuts the end wall 22 of the housing and the bearing surface 33' on the base part 2 engages the bearing surface 29' at the upper end 23 of the housing 20.

It will be observed from FIG. 1 that the side walls 21 of the housing 20 embrace the base part 2 and also act as guides in the engagement procedure. In use, the base part 2 is substantially hidden from view. The bracket 1 may be removed from the base part 2 by the reverse of the above procedure, i.e. sliding in the opposite direction.

However, should the bracket 1 when attached to the base part 2, receive a blow through the mirror case 17 acting to move the housing 20 away from the base part 2 the tongues 28 will be forced apart against their inherent spring bias, and will be released from the boss 30 on the base part 2, to release the bracket 1 from the base part 2. Thus, while the tongues 28 of the spring clip 24 serve to firmly retain the bracket on the base part 2, a sudden blow to the mirror case will result in disengagement of the bracket 1 from the base part 2.

The three point loading arrangement of the bracket 1 on the base part 2 through the use of the bearing surfaces 33',33" on the base part 2 and the bearing surfaces 29',29" of the housing 20 serves to provide excellent vibrational stability of the bracket 1 on the base part 2.

In addition, since the direction of mounting of the bracket 1 on the base part 2 is through an upward movement of the bracket 1, this allows the base part 2 to be located much closer to the top edge of a vehicle windscreen since no clearance is required above the base part 2 for remounting of the bracket 1.

It will be appreciated that in another embodiment of the invention the spring clip 24 may be integrally formed with the housing 20. The spring clip 24 may be comprised of either plastics or metal. A particular advantage of the invention is that the initial force of instalation is very low facilitating ready and correct location of the bracket 1 on the base part 2 with the largest force being required just as the engagement is near completion.

Figure 6:
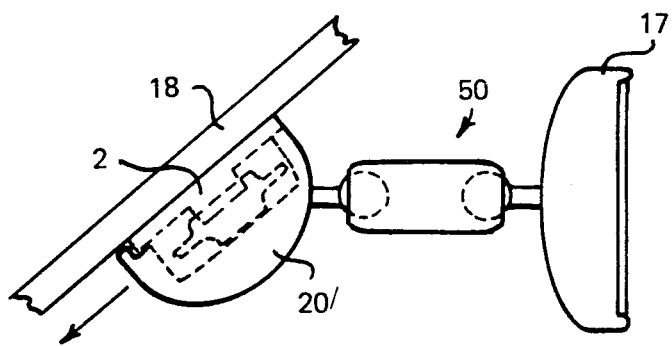
FIG. 6 is a side view of the mounting assembly including a double articulating ball type bracket.

In FIG. 6 there is shown a double articulating ball type bracket 50 having a housing 20, similar to that described above, mounted on a base part 2 as described above.

We claim:

1. In a mounting assembly for a vehicle interior rearview mirror, the assembly comprising a base part for attaching directly to the inside surface of a vehicle windscreen, a mirror case support bracket having at one end means for mounting a mirror case and at the other end means for sliding engagement with said base part to mount said bracket onto said base part, and abutment means on one of said bracket and base part for engaging a portion of the other of said bracket and base part to define a fully engaged position of said bracket on said base part, one of said base part and bracket having a resilient clip and the other of said base part and bracket having flange means, said clip and flange means being brought into contact during said sliding engagement and being effective to retain said bracket on said base part by resilient engagement of said clip with said flange means, said bracket further being blow-releasable from said base part in the fully engaged position, the improvement wherein bearing surfaces are provided on said base pat and bracket respectively which come to bear against one another just as said bracket nears said fully engaged position during said sliding engagement and, when said abutment means bracket slightly away from said base paret against the resilient bias of said clip, compared to the position of said bracket during the prior part of said sliding engagement o as to increase the force exerted by said clip on said flange means when in said fully engaged position.

2. A mounting assembly as claimed in claim 1, wherein said bearing surfaces provide a three-point loading of said bracket on said base part.

3. A mounting assembly as claimed in claim 2, wherein said bearing surfaces comprise three projecting on said base part which respectively engage three surface portions of said bracket, at least one of each engaging pair of projections and surface portions being inclined relative to the direction of sliding said bracket onto said base part.

4. A mounting assembly as claimed in claim 1, wherein said clip is carried by said bracket and said flange means is carried by said base part.

5. A mounting assembly as claimed in claim 4, wherein said flange means comprises a boss carried by said base part, said boss having two flanges extending laterally from either side thereof, and said clip comprising a pair of arms which embrace and engage said flanges, said flanges resiliently expanding said arms in said fully engaged position.

6. The mounting assembly of claim 1 wherein said bearing surface includes shifting means for shifting said bracket from a first position in which said clip engages said flange means without significant resiliency to a second position spaced away from said base from said first position in which said clip is resilient engaged with said flange means, said shifting means being fully operable upon engagement of said abutment means with said portion the other of said bracket and base part.

7. A mounting assembly as claimed in claim 1, wherein said bearing surfaces are spaced at opposite ends of aid bracket in a triangular relationship and provide a three-point loading of said bracket on said base part.

* * * * *

UNITED STATES PATENT AND TRADEMARK OFFICE
CERTIFICATE OF CORRECTION

Page 1 of 2

PATENT NO. : 5,058,851
DATED : October 22, 1991
INVENTOR(S) : Patrick J. Lawlor et al.

It is certified that error appears in the above-identified patent and that said Letters Patent is hereby corrected as shown below:

Column 2, line 20:

After "under" insert --repeated heating and cooling cycles of the vehicle--

Column 3, line 56:

"housing 20," should be --housing 20'--

Column 4, line 18:

"base pat" should be --base part--

Column 4, line 21:

After "means" insert --engage said portion, are effective to force said--

Column 4, line 22:

"paret" should be --part--

UNITED STATES PATENT AND TRADEMARK OFFICE
CERTIFICATE OF CORRECTION

PATENT NO. : 5,058,851

DATED : October 22, 1991

INVENTOR(S) : Patrick J. Lawlor et al.

It is certified that error appears in the above-identified patent and that said Letters Patent is hereby corrected as shown below:

Column 4, line 24:

"o as to" should be --so as to--

Column 4, line 31:

"projecting" should be --projections--

Column 4, line 52:

"resilient" should be --resiliently--

Column 4, line 58:

"aid bracket" should be --said bracket--

Signed and Sealed this

Twentieth Day of April, 1993

Attest:

MICHAEL K. KIRK

Attesting Officer

Acting Commissioner of Patents and Trademarks